United States Patent
Tsou et al.

(10) Patent No.: US 10,296,231 B2
(45) Date of Patent: May 21, 2019

(54) DATA-STORAGE DEVICE AND DATA MAINTENANCE METHOD THEREOF

(71) Applicant: Silicon Motion, Inc., Jhubei, Hsinchu County (TW)

(72) Inventors: Tai-Yu Tsou, Hengshan Township, Hsinchu County (TW); Po-Chia Chu, Kaohsiung (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 0 days.

(21) Appl. No.: 15/863,889

(22) Filed: Jan. 6, 2018

(65) Prior Publication Data

US 2018/0260137 A1 Sep. 13, 2018

(30) Foreign Application Priority Data

Mar. 7, 2017 (TW) .............................. 106107358 A

(51) Int. Cl.
  *G06F 3/06* (2006.01)
  *G06F 12/02* (2006.01)

(52) U.S. Cl.
  CPC .......... *G06F 3/0611* (2013.01); *G06F 3/0616* (2013.01); *G06F 3/0659* (2013.01); *G06F 3/0679* (2013.01); *G06F 12/0246* (2013.01); *G06F 2212/7211* (2013.01)

(58) Field of Classification Search
  CPC .... G06F 3/0611; G06F 3/0659; G06F 3/0679; G06F 12/0246; G06F 2212/7211
  See application file for complete search history.

(56) References Cited

U.S. PATENT DOCUMENTS

| | | | |
|---|---|---|---|
| 7,415,557 B2 | 8/2008 | Patella | |
| 8,683,148 B2 | 3/2014 | Raz et al. | |
| 9,431,117 B2* | 8/2016 | Jung | ................... G06F 12/0253 |
| 9,619,381 B2 | 4/2017 | Camp et al. | |
| 2013/0138871 A1 | 5/2013 | Chiu et al. | |
| 2015/0186225 A1 | 7/2015 | Lin et al. | |
| 2017/0131759 A1 | 5/2017 | Wong et al. | |

FOREIGN PATENT DOCUMENTS

| | | |
|---|---|---|
| CN | 104731523 A | 6/2015 |
| TW | 200707169 A | 2/2007 |
| TW | 201209593 A | 3/2012 |
| TW | 201321977 A | 6/2013 |

* cited by examiner

*Primary Examiner* — Aracelis Ruiz
(74) *Attorney, Agent, or Firm* — McClure, Qualey & Rodack, LLP

(57) ABSTRACT

The present invention provides a data storage device including a flash memory and a controller. The controller receives a read command arranged to read data from a host, determines a plurality of read tasks by analyzing the read command, and determines task time of each of the read tasks according to the number of the read tasks and an I/O latency time. In a first read task of the read tasks, the controller reads a part of the data and transmits the read part to the host, and executes a first maintenance process according to a predetermined condition, wherein the predetermined condition includes a remain time and the remain time is the task time minus the time spent by the first read task.

26 Claims, 3 Drawing Sheets

DATA-STORAGE DEVICE AND DATA MAINTENANCE METHOD THEREOF

CROSS REFERENCE TO RELATED APPLICATIONS

This Application claims priority of Taiwan Patent Application No. 106107358, filed on Mar. 7, 2017, the entirety of which is incorporated by reference herein.

BACKGROUND OF THE INVENTION

Field of the Invention

The present invention relates to a data-maintenance method for a memory device and in particular to a data-maintenance method used in a read process.

Description of the Related Art

Flash memory is a widely used non-volatile data-storage medium, using electrical methods to erase and program itself. Taking NAND Flash as an example, it is often used in storage mediums such as memory cards, USB flash devices, solid state devices (SSDs), embedded multimedia cards (eMMCs), etc.

Flash memory is a widely used non-volatile data-storage medium, using electrical methods to erase and program itself. Taking NAND Flash as an example, it is often used as memory cards, USB flash devices, solid state devices (SSDs), embedded multimedia cards (eMMCs), etc.

The storage array of a flash memory (e.g. NAND flash) includes a plurality of blocks and each of the blocks has a plurality of pages arranged to store data, wherein a floating gate transistor can be used to form a flash memory. The floating gate in the floating gate transistor can capture the charge to store the data. However, the ability to capture the charge of the floating gate may be damaged by the time, the environment, and the degree of use. As a result, flash memory requires frequent maintenance of data. However, data maintenance may cause delays in the process time, causing the user to feel uncomfortable operation.

BRIEF SUMMARY OF THE INVENTION

A detailed description is given in the following embodiments with reference to the accompanying drawings.

The present invention provides a data-storage device. The data-storage device includes a flash memory and a controller. The controller receives a read command arranged to read data from a host, determines a plurality of read tasks by analyzing the read command, and determines task time of each of the read tasks according to the number of the read tasks and an I/O latency time of the read command. In a first read task of the read tasks, the controller reads a part of the data and transmits the read part to the host, and executes a first maintenance process according to a predetermined condition, wherein the predetermined condition includes a remain time of the task time and the remain time is the task time minus the time spent by the first read task.

In an embodiment, the task time is a value obtained by dividing the I/O latency time by the number of the read tasks, and the task time is less than a data subset read time-out time. In another embodiment, the task times are gradually decreased with the order of execution of the read tasks and each of the task times is less than a data subset read time-out time.

In addition, the controller further determines a plurality of maintenance processes after transmitting the read part to the host, wherein the maintenance processes are arranged to maintain data in the flash memory. In an embodiment, the maintenance processes comprise a wear-leveling process, a read reclaim process, a read refresh process, and a data collection process. When a difference between the minimum one of the erase counts and the maximum one of the erase counts among the blocks is greater than a predetermined difference value, the controller determines that the maintenance processes include a wear-leveling process. When the number of error bits for the data in the flash memory is greater than a predetermined number of error bits, the controller determines that the maintenance processes include a read reclaim process. When a read count for the data in the flash memory is greater than a predetermined read count, the controller determines that the maintenance processes include a read refresh process. When the number of triple-level cell spare blocks in the blocks is less than a predetermined number of blocks, the controller determines that the maintenance processes include a data collection process.

In an embodiment, in the first read task, the controller selects one of the maintenance processes as the first maintenance process according to the predetermined condition, wherein the predetermined condition further comprises priorities of the maintenance processes. For example, the priority of the read reclaim process is greater than the priority of the data collection process, the priority of the data collection process is greater than the priority of the read refresh process, and the priority of the read refresh process is greater than the priority of the wear-leveling process.

In another embodiment, in the first read task, the controller is further configured to determine whether the remain time has exceeded a predetermined value after the end of the first maintenance process, and when the remain time has exceeded the predetermined value, selects a second maintenance process from one of the maintenance processes that has not yet been executed according to the predetermined condition, and executes the selected second maintenance process. When the remain time is less than the predetermined value, the first read task is ended to execute a second read task of the read tasks The present invention further provides a data-maintenance method applied to a data storage device having a flash memory. The method includes the following steps: receiving a read command arranged to read data from a host; determining a plurality of read tasks by analyzing the read command; and determining task time of each of the read tasks according to the number of the read tasks and an I/O latency time of the read command. A first read task of the read tasks comprises the following steps: reading a part of the data from the flash memory; transmitting the read part to the host; and executing a first maintenance process according to a predetermined condition, wherein the predetermined condition includes a remain time and the remain time is the task time minus the time spent by the first read task.

In an embodiment, the task time is the value obtained by dividing the I/O latency time by the number of the read tasks, and the task time is less than a data subset read time-out time. In another embodiment, the task times are gradually decreased with the order of execution of the read tasks, and each of the task times is less than a data subset read time-out time.

In addition, the first read task further comprises: determining a plurality of maintenance processes after transmitting the read part to the host; and selecting one of the maintenance processes as the first maintenance process according to the predetermined condition. In an embodiment, the maintenance processes are arranged to maintain data in the flash memory, and the maintenance processes comprise a wear-leveling process, a read reclaim process, a read refresh process, and a data collection process. In an embodiment, the step of determining the maintenance processes further comprises: determining that the maintenance processes include a wear-leveling process when a difference between the minimum one of the erase counts and the maximum one of the erase counts among the blocks is greater than a predetermined difference value; determining that the maintenance processes include a read reclaim process when the number of error bits for the data in the flash memory is greater than a predetermined number of error bits; determining that the maintenance processes include a read refresh process when a read count for the data in the flash memory is greater than a predetermined read count; and determining the maintenance processes including a data collection process when the number of triple-level cell spare blocks in the blocks is less than a predetermined number of blocks.

In an embodiment, the predetermined condition further comprises priorities of the maintenance processes, wherein the priority of the read reclaim process is greater than the priority of the data collection process, the priority of the data collection process is greater than the priority of the read refresh process, and the priority of the read refresh process is greater than the priority of the wear-leveling process.

In addition, the first read task further comprises: determining whether the remain time has exceeded a predetermined value after the end of the first maintenance process; selecting a second maintenance process from one of the maintenance processes that has not yet been executed according to the predetermined condition when the remain time has exceeded the predetermined value; and ending the first read task to execute a second read task of the read tasks when the remain time is less than the predetermined value.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
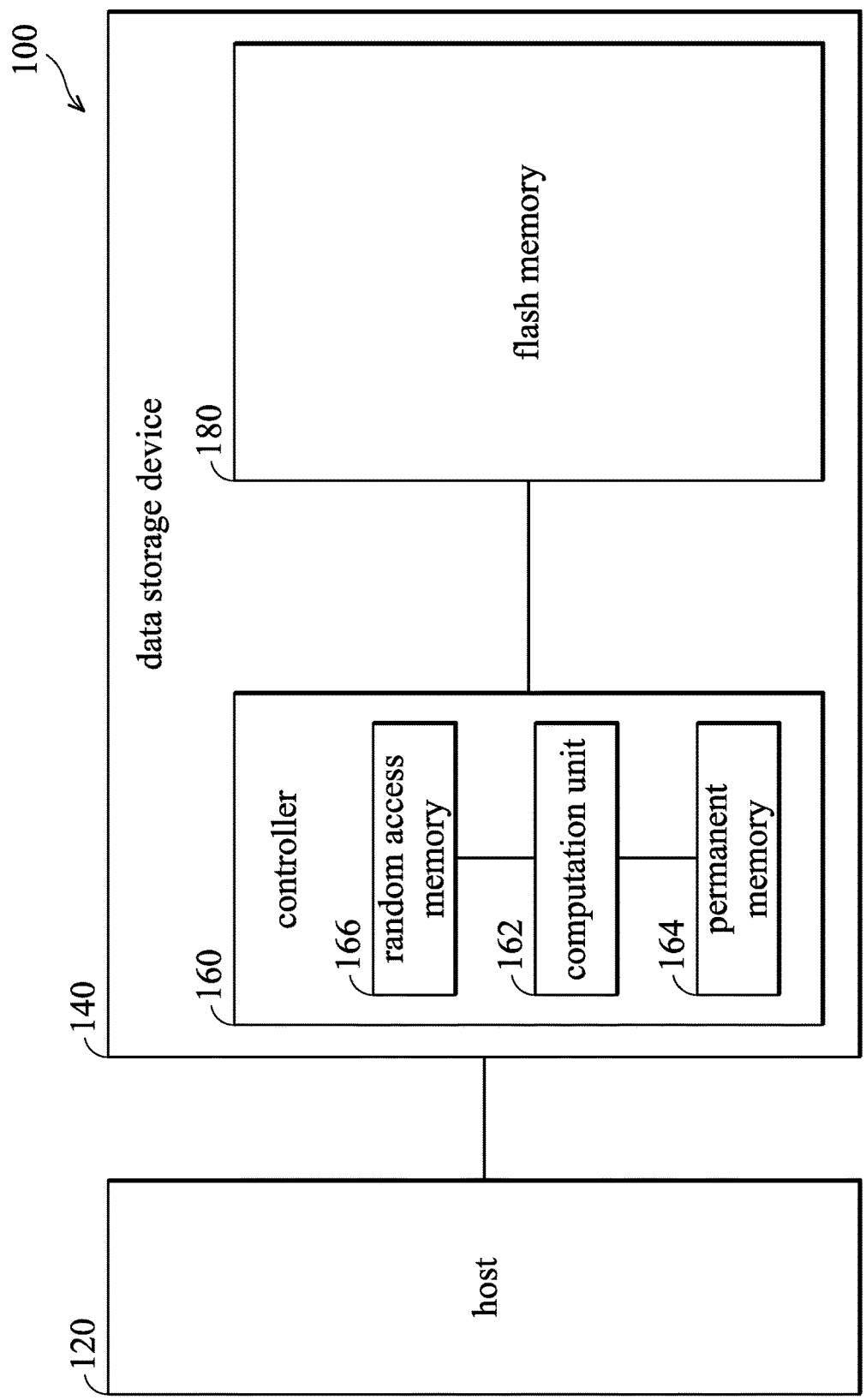
FIG. 1 is a schematic diagram illustrating an embodiment of an electronic system of the present invention.

FIG. 1 is a schematic diagram illustrating an embodiment of an electronic system of the present invention. The electronic system 100 includes a host 120 and a data-storage device 140. The data-storage device 140 includes a flash memory 180 and a controller 160 arranged to operate in response to the commands of the host 120. The controller 160 includes a computation unit 162 and a permanent memory 164, such as a read-only memory (ROM), and a random access memory (RAM) 166. The permanent memory 164 and the program code and data stored in the permanent memory 164 constitute firmware executed by the processing unit 162, and the controller 160 is configured to control the flash memory 180 based on the firmware. The random access memory (RAM) 166 is configured to load program codes and parameters that are provided to the controller 160 to execute associated actions based on the program codes and parameters. For example, the controller 160 may execute a read task and a maintenance process.

The flash memory 180 includes a plurality of blocks, and each of the blocks includes a plurality of pages. It should be noted that data of the flash memory 180 is being erased in a basis of using a block as a smallest unit and is being written in a basis of using a page as a smallest unit. It should be noted that the blocks in the flash memory 180 have different properties, wherein the blocks can be divided into Single-Level Cell blocks (SLC blocks) and Triple-Level Cell blocks (TLC blocks), but the invention is not limited thereto. In other embodiments, the blocks may have only TLC blocks without having any SLC blocks. The TLC block and the SLC block are written using different programming methods, and the TLC block is thrice the data capacity of the SLC block, wherein SLC blocks that store valid data are SLC data blocks and SLC blocks that do not store valid data and are undamaged are SLC spare blocks. TLC blocks that store valid data are TLC data blocks, and TLC blocks that do not store valid data and are undamaged are TLC spare blocks. In one embodiment, user data will be stored in the TLC blocks. In addition, user can read the data from the flash memory 180 by the host 120.

In one embodiment, when the controller 160 receives a read command from the host 120, the controller 160 must read data instructed by the read command from the flash memory 180 and transmit all the read data to the host 120 within an input/output latency (I/O latency time time). In other words, the controller 160 must execute the read command within the I/O latency time. For example, the I/O latency time may be 2 seconds, but the invention is not limited thereto. In other embodiments, the I/O latency time may be another time set by the circuit designer or the specification specifier. In addition, when the data instructed by the read command exceeds a read unit of the flash memory 180, the data instructed by the read command may be divided into a number of data segments and successively transmitted to the host 120, in which the read unit may be an data amount of a page or a predetermined length, and the invention is not limited thereto. For example, if the data instructed by the read command has a total of 96K bytes and the flash memory 180 is read in units of 32K bytes, the controller 160 first reads a first data segment of 32K bytes in the read data and after the first data segment is transmitted to the host 120, reads a second data segment of 32K bytes in the remain data, and finally, after the second data segment is transmitted to the host 120, reads a third data segment of 32K bytes remained and transmits the third data segment to the host 120. In one embodiment, the read task for each data segment must be completed within a data subset read time-out time. In other words, for each read task for reading the first data segment, the second data segment, and the third data segment, the time from the reading of the data segment from the flash memory 180 to the reading of the next data segment must be less than the data subset read time-out time. For example, the data subset read time-out time may be 100 milliseconds, but the invention is not limited thereto. In other embodiments, the data subset read time-out time may be another time set by the vendor, circuit designer, or specification specifier.

In addition to satisfying the limitation of the working time (I/O latency time and the data subset read time-out time), in order to avoid data damage in the flash memory 180 and to properly utilize the memory space in the flash memory 180, the controller 160 also executes a data maintenance process for the flash memory 180 at an appropriate time depending on read count, the erase count, the number of error bits, and the number of TLC spare blocks. In one embodiment, the flash memory 180 is further available to store at least one parameter table to separately record read count per page, the erase count per block, the error bits of the data in each page and/or the number of TLC spare blocks in the flash memory 180, but the invention is not limited thereto. In other embodiments, read count per page and the erase count per block can also be stored in the corresponding block or page, wherein read count is the number of times the block has been read and the erase count is the number of times the block has been erased. In addition, the controller 160 may obtain the number of error bits of the data in each page by reading the data of the flash memory 180 and comparing the read data with the check code. In one embodiment, the controller 160, upon receiving the read command, executes the data maintenance process concurrently while the read command is being executed. However, if the execution time of the data maintenance process is too long, it will exceed the working time (I/O latency time and data subset read time-out time) limited by the specifications and/or vendor, causing a poor usage feeling for the user.

Accordingly, when receiving the read command, the controller 160 enters the read state and proceeds to the background operating state (eMMC background operations, BKOPS) in the read state to execute the data maintenance process. The controller 160 is further configured to record the elapsed time based on a timer (GC timer) and dynamically adjust the maintenance process according to the remain time.

Specifically, after the host 120 receives a read command arranged to read data, the controller 160 analyzes a plurality of read tasks required for the read command, wherein each read task is arranged to read data in one read unit of the flash memory 180, or a logical address (LBA) corresponding to the read command. In other words, after receiving the read command, the controller 160 analyzes the number of read tasks that need to be executed, the data address and length of each read task and related instructions according to the length and the address of the data instructed by the read command. Next, the controller 160 determines the task time of each read task based on the I/O latency time and the number of read tasks of the read command. In one embodiment, the task time is a value obtained by dividing the I/O latency time by the number of read tasks, and the task time must be less than the data subset read time-out time. In other words, the task time of each read task is the same, and if the task time which is the value obtained by dividing the I/O latency time by the number of read tasks is greater than the data subset read time-out time, the task time is equal to the data subset read time-out time, but the invention is not limited thereto. In another embodiment, the task times are gradually decreased according to the order of execution of the read tasks, and each task time is less than a data subset read time-out time. In other words, the task time may have a plurality of predetermined values, wherein the controller 160 assigns a task time with a longer time period to the first read task and assigns a task time with a shorter time period to the subsequent read task based on the number of read tasks and the I/O latency time and so on. As described above, by preliminarily determining the task time of each read task, the controller 160 can control the maintenance process to be executed within the determined task time to avoid the aforementioned problems of exceeding the working time (I/O latency time and data subset read time-out time) limited by the specifications and/or vendor and causing a poor usage feeling for the user.

However, the controller 160 must also apply specific rules to control the maintenance process to be completed within the determined task time. In one embodiment, the controller 160 chooses to execute a suitable maintenance process in the required maintenance processes according to the remaining task time and/or the degree of importance of the maintenance process to achieve a goal for controlling the maintenance process to be completed within the determined task time. To be more specific, in a first read task of the read tasks, the controller 160 first reads a part of the data instructed by the received read command from the flash memory 180 and transmits the read part to the host 120. After transmitting the part of the read data to the host 120, the controller 160 is further configured to determine a plurality of maintenance processes required for the current flash memory 180, wherein the maintenance processes are arranged to maintain data in the flash memory 180.

In one embodiment, the types of maintenance processes include a wear-leveling process, a read reclaim process, a read refresh process, and a data collection process.

When a difference between the minimum one of the erase counts and the maximum one of the erase counts among the blocks is greater than a predetermined difference value, the controller 160 determines that the maintenance processes include a wear-leveling process. In other words, when a difference in the erase count between one of the blocks that has the minimum erase count and one of the blocks that has the maximum erase count in the flash memory 180 is greater than a predetermined difference value, the controller 160 needs to reduce the difference in the erase count by the wear-leveling process. In one embodiment, the predetermined difference value is 50, but the invention is not limited thereto. In other embodiments, the predetermined difference value may also be other values set by the circuit designer.

When the number of error bits for the data in the flash memory 180 is greater than a predetermined number of error bits, the controller 160 determines that the required maintenance processes include a read reclaim process. In other words, when the controller 160 finds that the number of error bits of at least one of the pages in the flash memory 180 is greater than the predetermined number of error bits during reading the data, the controller 160 may move the data that has higher number of error bits to another page or block by the read reclaim process to avoid data corruption.

When the read count for the data in the flash memory 180 is greater than a predetermined read count, the controller 160 determines that the maintenance processes include a read refresh process. In other words, when the controller 160 finds that the read count of any of the pages in the flash memory 180 is greater than the predetermined read count, the controller 160 can move the data that has higher read count to another page or block by the read refresh process to avoid data corruption.

When the number of TLC spare blocks in the blocks is less than a predetermined number of blocks, the controller 160 determines that the maintenance processes include a data collection process. In other words, when the number of TLC spare blocks that the user data can be written into in the flash memory 180 is less than the predetermined number of blocks, it indicates that the space of the flash memory 180 is not enough. Thus, the controller 160 may collectively write valid data into a new block by the data collection process to release the blocks being occupied. For example, the flash memory 180 has a first TLC data block, a second TLC data block, a third TLC data block, and a fourth TLC spare block, wherein each of the TLC blocks has 16 pages. The first TLC data block consists of ten pages with valid data and six pages that do not have valid data. The second TLC data block consists of four pages with valid data and twelve pages that do not have valid data. The third TLC data block consists of a page with valid data and 15 pages that do not have valid data, and the fourth TLC spare block does not have any valid data. In the data collection process, the controller 160 writes the valid data in the first TLC data block, the second TLC data block, and the third TLC data block to the 15 pages of the fourth TLC spare block, and releases the first TLC data block, the second TLC data block, and the third TLC data block as three new TLC spare blocks to increase the number of TLC spare blocks. It should be noted that the number of SLC spare blocks can also be increased by the above method.

After determining the maintenance processes required by the current flash memory 180, the controller 160 is further configured to select one of the maintenance processes as a first maintenance process according to a predetermined condition. For example, the controller 160 determines that the maintenance processes currently required include the wear-leveling process and the read reclaim process based on the read count, the erase count, and the number of error bits, and the number of TLC spare blocks and selects the read reclaim process from the wear-leveling process and the read reclaim process as the first maintenance process according to the predetermined condition, but the invention is not limited thereto. Then, the controller 160 continues to execute the first maintenance process according to a predetermined condition in the first read task. In one embodiment, the predetermined condition includes a remain time, and the remain time is the task time minus the time spent by the first read task, but the invention is not limited thereto. For example, the controller 160 first selects a maintenance process that can be ended within the remain time as a first maintenance process. In another embodiment, the predetermined condition further includes priorities of the maintenance processes. For example, when multiple maintenance processes can be completed within the remain time, the controller 160 may first select the maintenance process with the higher priority as the first maintenance process. In one embodiment, the priority of the read reclaim process is greater than the priority of the data collection process, the priority of the data collection process is greater than the priority of the read refresh process, and the priority of the read refresh process is greater than the priority of the wear-leveling process, but the invention is not limited thereto. In other embodiments, the circuit designer may assign priority according to the degree of importance of the maintenance process. It should be noted that, in general, the wear-leveling process and the data collection process are maintenance processes being executed in the writing process. Thus, in this embodiment, the wear-leveling process and the data collection process have lower priorities.

It should be noted that, in some embodiments, the required maintenance process may have only one. Thus, the controller 160 does not need to select one of the plurality of maintenance processes, which can directly determine whether the maintenance process can be executed in the remain time based on the predetermined conditions. When the predetermined condition can be executed within the remain time, the controller 160 regards this only one maintenance process as the first maintenance process and executes the first maintenance process.

Next, in the first read task, the controller 160 is further configured to determine whether the remain time has exceeded a predetermined value after the first maintenance process has ended. When the remain time has exceeded a predetermined value, the controller 160 is further configured to continue to select one of unexecuted maintenance process which is the maintenance processes that has not yet been executed in the maintenance process as a second maintenance process according to a predetermined condition, and to continue to execute the second maintenance process in the first read task. When the remain time is less than the predetermined value, the controller 160 ends the first read task and then executes a second read task that has not yet been executed in the read tasks.

Figure 2A:
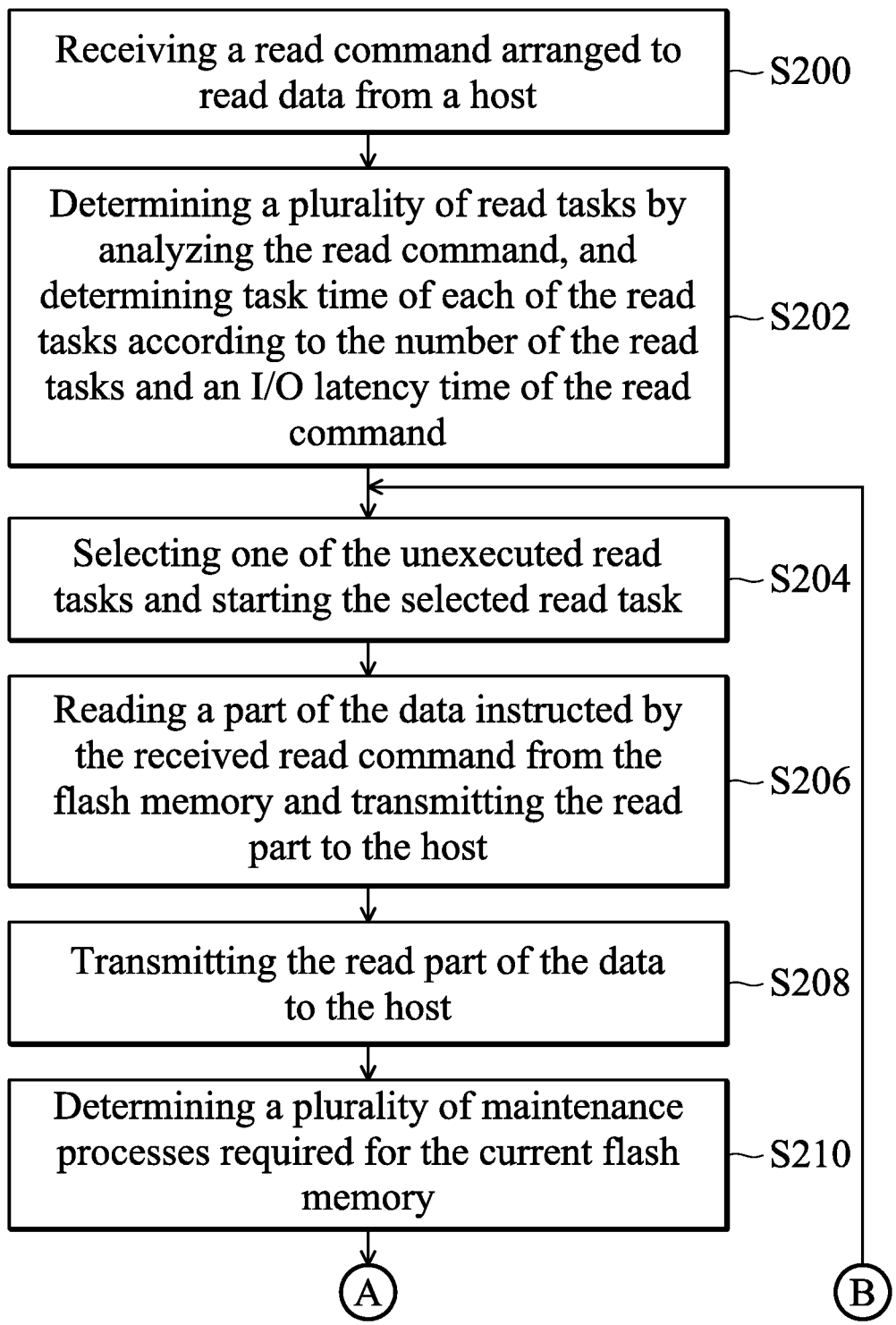
FIGS. 2A and 2B are portions of a flow chart of a data-maintenance method in accordance with an embodiment of the invention.
Figure 2B:
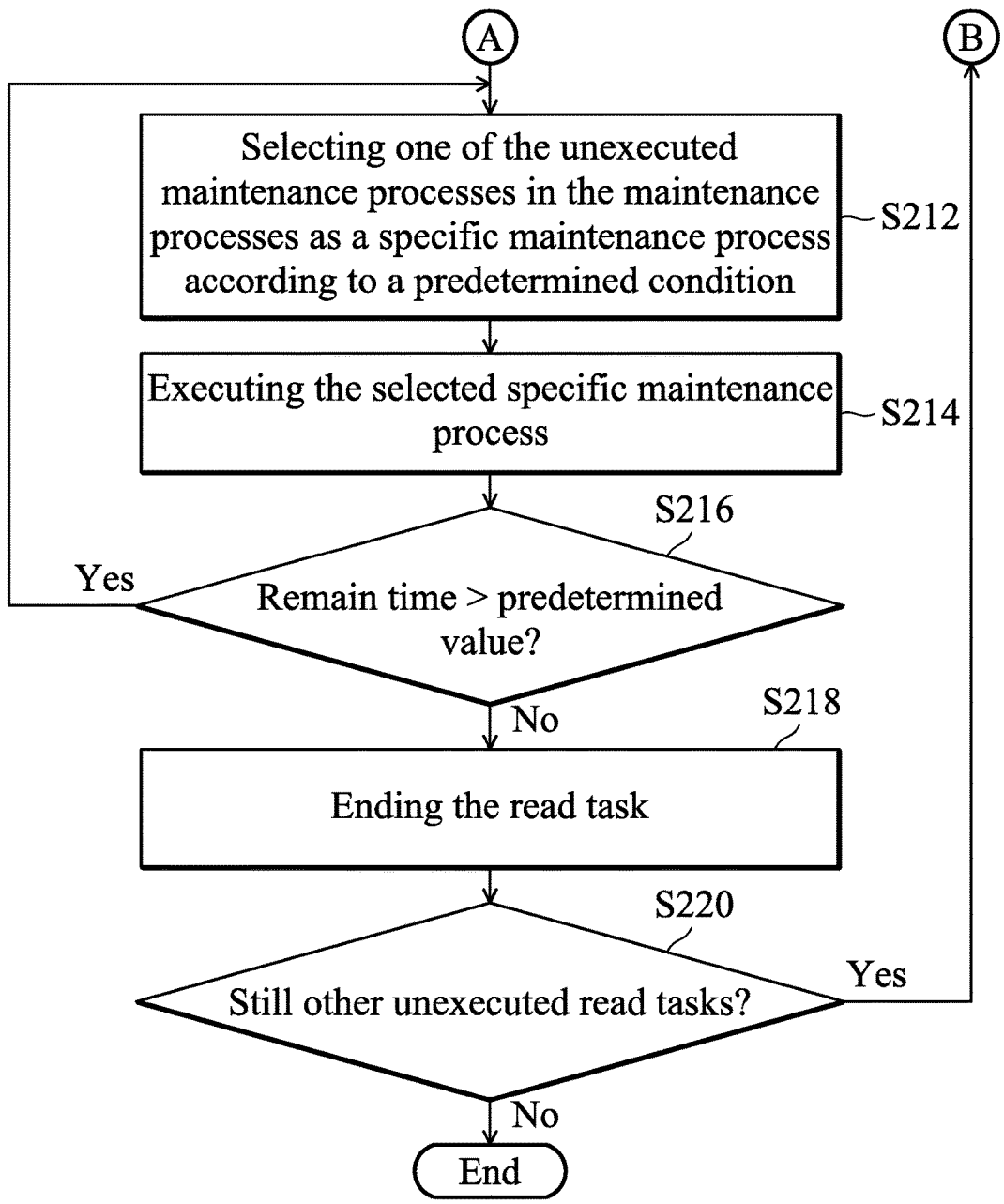

FIG. 2 is a flow chart of a data-maintenance method in accordance with another embodiment of the invention. The data-maintenance method can be applied to the data-storage device 140 shown in FIG. 1. The flow starts at step S200.

In step S200, the controller 160 receives a read command arranged to read data from the host 120.

Next, in step S202, the controller 160 determines a plurality of read tasks by analyzing the read command and determines task time of each of the read tasks according to the number of the read tasks and an I/O latency time of the read command, wherein each read task is arranged to read data in one read unit of the flash memory 180 or a logical address (LBA) corresponding to the read command. In other words, after receiving the read command, the controller 160 analyzes the number of read tasks that need to be executed, the data address and length of each read task and related instructions according to the length and the address of the data instructed by the read command. Next, the controller 160 determines the task time of each read task based on the I/O latency time and the number of read tasks of the read command. In one embodiment, the task time is a value obtained by dividing the I/O latency time by the number of read tasks, and the task time must be less than the data subset read time-out time. In other words, the task time of each read task is the same, and if the task time which is the value obtained by dividing the I/O latency time by the number of read tasks is greater than the data subset read time-out time, the task time is equal to the data subset read time-out time, but the invention is not limited thereto. In another embodiment, the task times are gradually decreased according to the order of execution of the read tasks, and each task time is less than a data subset read time-out time. In other words, the task time may have a plurality of predetermined values, wherein the controller 160 assigns a task time with a longer time period to the first read task and assigns a task time with a shorter time period to the subsequent read task based on the number of read tasks and the I/O latency time and so on.

Next, in step S204, the controller 160 selects one of the unexecuted read tasks to start the selected read task. Herein, the controller 160 may select one of the read tasks according to the order of the addresses, but the invention is not limited thereto.

In step S206, the controller 160 first reads a part of the data instructed by the received read command from the flash memory 180 and transmits the read part to the host 120, wherein the part read by the controller 160 is the data segment corresponding to the read task selected in step S204.

Next, in step S208, the controller 160 transmits a part of the read data to the host 120.

Thereafter, in step S210, the controller 160 determines a plurality of maintenance processes required for the current flash memory 180, wherein the maintenance processes are arranged to maintain data in the flash memory 180. In one embodiment, the types of maintenance processes include a wear-leveling process, a read reclaim process, a read refresh process, and a data collection process, but the invention is not limited thereto. When a difference between the minimum one of the erase counts and the maximum one of the erase counts among the blocks is greater than a predetermined difference value, the controller 160 determines that the maintenance processes include a wear-leveling process. When the number of error bits for the data in the flash memory 180 is greater than a predetermined number of error bits, the controller 160 determines that the required maintenance processes include a read reclaim process. When the read count for the data in the flash memory 180 is greater than a predetermined read count, the controller 160 determines that the maintenance processes include a read refresh process. When the number of TLC spare blocks in the blocks is less than a predetermined number of blocks, the controller 160 determines that the maintenance processes include a data collection process.

Next, in step S212, the controller 160 selects one of the unexecuted maintenance processes in the maintenance processes as a specific maintenance process in the maintenance process according to a predetermined condition. In one embodiment, the predetermined condition includes a remain time, and the remain time is the task time minus the time spent by the first read task, but the invention is not limited thereto. For example, the controller 160 first selects a maintenance process that can be ended within the remain time as the specific maintenance process. In another embodiment, the predetermined condition further includes priorities of the maintenance processes. For example, when multiple maintenance processes can be completed within the remain time, the controller 160 may first select the maintenance process with the higher priority as the specific maintenance process. In one embodiment, the priority of the read reclaim process is greater than the priority of the data collection process, the priority of the data collection process is greater than the priority of the read refresh process, and the priority of the read refresh process is greater than the priority of the wear-leveling process, but the invention is not limited thereto. In other embodiments, the circuit designer may assign priority according to the degree of importance of the maintenance process. It should be noted that, in general, the wear-leveling process and the data collection process are maintenance processes being executed in the writing process. Thus, in this embodiment, the wear-leveling process and the data collection process have lower priorities.

Next, in step S214, the controller 160 executes the selected specific maintenance process.

In step S216, the controller 160 determines whether the remain time has exceeded a predetermined value. When the remain time has exceeded the predetermined value, the flow goes back to step S212, and the controller 160 selects another maintenance process according to the predetermined condition. When the remain time is less than the predetermined value, step S218 is performed.

In step S218, current read task is ended.

Next, in step S220, the controller 160 determines whether there are still other unexecuted read tasks. In other words, it is determined whether the data instructed by the read command received at step S200 has been completely transmitted to the host 120. When there are still other unexecuted read tasks, the flow goes back to step S204, and the controller 160 selects another unexecuted read task to start another read task. When there are no unexecuted read tasks, the flow in FIG. 2 ends at step S220.

As described above, the data storage device 140 and the data-maintenance method in the invention can determine the task time based on the I/O latency time and dynamically adjust the maintenance processes according to the remaining task time, thereby executing the background maintenance process at the same time in the read state and making the background maintenance process does not affect the normal operation of the read process.

Data-maintenance methods, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data-storage device, comprising:
    a flash memory; and
    a controller, configured to receive a read command arranged to read data from a host, determine a plurality of read tasks by analyzing the read command, and determine task time of each of the read tasks according to a number of the read tasks and an I/O latency time of the read command,
    wherein in a first read task of the read tasks, the controller reads a part of the data from the flash memory, transmits the read part to the host, and executes a first maintenance process according to a predetermined condition, wherein the predetermined condition includes a remain time and the remain time is the task time minus the time spent by the first read task.

2. The data-storage device as claimed in claim 1, wherein the task time is a value obtained by dividing the I/O latency time by the number of the read tasks, and the task time is less than a data subset read time-out time.

3. The data-storage device as claimed in claim 1, wherein the task times are gradually decreased with an order of execution of the read tasks and each of the task times is less than a data subset read time-out time.

4. The data-storage device as claimed in claim 1, wherein the controller is further configured to determine a plurality of maintenance processes after transmitting the read part to the host, wherein the maintenance processes are arranged to maintain data in the flash memory.

5. The data-storage device as claimed in claim 4, wherein the flash memory has a plurality of blocks, and each of the blocks has an erase count, and the controller determines that the maintenance processes include a wear-leveling process when a difference between a minimum one of the erase counts and a maximum one of the erase counts among the blocks is greater than a predetermined difference value.

6. The data-storage device as claimed in claim 4, wherein when a number of error bits for the data in the flash memory is greater than a predetermined number of error bits, the controller determines that the maintenance processes include a read reclaim process.

7. The data-storage device as claimed in claim 4, wherein when a read count for the data in the flash memory is greater than a predetermined read count, the controller determines that the maintenance processes include a read refresh process.

8. The data-storage device as claimed in claim 4, wherein the flash memory has a plurality of blocks, and when a number of triple-level cell spare blocks in the blocks is less than a predetermined number of blocks, the controller determines that the maintenance processes include a data collection process.

9. The data-storage device as claimed in claim 4, wherein in the first read task, the controller selects one of the maintenance processes as the first maintenance process according to the predetermined condition.

10. The data-storage device as claimed in claim 9, wherein the predetermined condition further comprises priorities of the maintenance processes.

11. The data-storage device as claimed in claim 10, wherein in the first read task, the controller is further configured to determine whether the remain time has exceeded a predetermined value after the end of the first maintenance process, and when the remain time has exceeded the predetermined value, select a second maintenance process from one of the maintenance processes that has not yet been executed according to the predetermined condition, and execute the selected second maintenance process.

12. The data-storage device as claimed in claim 11, wherein when the remain time is less than the predetermined value, the first read task is ended to execute a second read task of the read tasks.

13. The data-storage device as claimed in claim 9, wherein the maintenance processes comprise a wear-leveling process, a read reclaim process, a read refresh process, and a data collection process, wherein the priority of the read reclaim process is greater than the priority of the data collection process, the priority of the data collection process is greater than the priority of the read refresh process, and the priority of the read refresh process is greater than the priority of the wear-leveling process.

14. A data-maintenance method applied to a data storage device having a flash memory, comprising:
receiving a read command arranged to read data from a host;
determining a plurality of read tasks by analyzing the read command; and
determining task time of each of the read tasks according to a number of the read tasks and an I/O latency time of the read command, wherein a first read task of the read tasks comprises:
reading a part of the data from the flash memory;
transmits the read part to the host; and
executing a first maintenance process according to a predetermined condition, wherein the predetermined condition includes a remain time and the remain time is the task time minus the time spent by the first read task.

15. The data-maintenance method as claimed in claim 14, wherein the task time is a value obtained by dividing the I/O latency time by the number of the read tasks, and the task time is less than a data subset read time-out time.

16. The data-maintenance method as claimed in claim 14, wherein the task times are gradually decreased with the order of execution of the read tasks, and each of the task times is less than a data subset read time-out time.

17. The data-maintenance method as claimed in claim 14, wherein the first read task further comprises:
determining a plurality of maintenance processes after transmitting the read part to the host,
wherein the maintenance processes are arranged to maintain data in the flash memory.

18. The data-maintenance method as claimed in claim 17, wherein the flash memory has a plurality of blocks, and each of the blocks has an erase count, and the step of determining the maintenance processes further comprises:
determining that the maintenance processes include a wear-leveling process when a difference between a minimum one of the erase counts and a maximum one of the erase counts among the blocks is greater than a predetermined difference value.

19. The data-maintenance method as claimed in claim 17, wherein the step of determining the maintenance processes further comprises:
determining that the maintenance processes include a read reclaim process when a number of error bits for the data in the flash memory is greater than a predetermined number of error bits.

20. The data-maintenance method as claimed in claim 17, wherein the step of determining the maintenance processes further comprises:
determining that the maintenance processes include a read refresh process when a read count for the data in the flash memory is greater than a predetermined read count.

21. The data-maintenance method as claimed in claim 17, wherein the flash memory has a plurality of blocks, and the step of determining the maintenance processes further comprises:
determining the maintenance processes including a data collection process when a number of triple-level cell spare blocks in the blocks is less than a predetermined number of blocks.

22. The data-maintenance method as claimed in claim 17, wherein the first read task further comprises:
selecting one of the maintenance processes as the first maintenance process according to the predetermined condition.

23. The data-maintenance method as claimed in claim 22, wherein the predetermined condition further comprises priorities of the maintenance processes.

24. The data-maintenance method as claimed in claim 23, wherein the maintenance processes comprise a wear-leveling process, a read reclaim process, a read refresh process, and a data collection process, wherein the priority of the read reclaim process is greater than the priority of the data collection process, the priority of the data collection process is greater than the priority of the read refresh process, and the priority of the read refresh process is greater than the priority of the wear-leveling process.

25. The data-maintenance method as claimed in claim 23, wherein the first read task further comprises:

determining whether the remain time has exceeded a predetermined value after the end of the first maintenance process;

selecting a second maintenance process from one of the maintenance processes that has not yet been executed according to the predetermined condition when the remain time has exceeded the predetermined value; and executing the selected second maintenance process.

26. The data-maintenance method as claimed in claim 25, wherein when the remain time is less than the predetermined value, the first read task is ended to execute a second read task of the read tasks.

* * * * *